US012387090B2

(12) United States Patent
Li et al.

(10) Patent No.: US 12,387,090 B2
(45) Date of Patent: Aug. 12, 2025

(54) NEURON SIMULATION CIRCUIT AND NEURAL NETWORK APPARATUS

(71) Applicant: TSINGHUA UNIVERSITY, Beijing (CN)

(72) Inventors: Xinyi Li, Beijing (CN); Huaqiang Wu, Beijing (CN); He Qian, Beijing (CN); Dong Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 902 days.

(21) Appl. No.: 17/560,801

(22) Filed: Dec. 23, 2021

(65) Prior Publication Data

US 2022/0207338 A1 Jun. 30, 2022

(30) Foreign Application Priority Data

Dec. 28, 2020 (CN) .......................... 202011575150.7

(51) Int. Cl.
*G06N 3/04* (2023.01)
*G06N 3/063* (2023.01)

(52) U.S. Cl.
CPC .............. *G06N 3/063* (2013.01); *G06N 3/04* (2013.01)

(58) Field of Classification Search
CPC .......... G06N 3/063; G06N 3/04; G06N 3/065; G06N 3/049
USPC ................................................. 365/148, 158
See application file for complete search history.

(56) References Cited

U.S. PATENT DOCUMENTS

| | | | | |
|---|---|---|---|---|
| 10,169,297 | B2* | 1/2019 | Buchanan | G06F 7/523 |
| 10,776,684 | B1* | 9/2020 | Agarwal | G06N 3/04 |
| 10,861,545 | B2* | 12/2020 | Dalgaty | G06N 3/049 |
| 10,970,441 | B1* | 4/2021 | Zhang | G06N 3/063 |
| 11,200,948 | B1* | 12/2021 | Ambrosi | G11C 13/0007 |
| 2017/0148513 | A1* | 5/2017 | Buchanan | H03G 1/0088 |
| 2017/0220526 | A1* | 8/2017 | Buchanan | G06F 7/523 |
| 2017/0316827 | A1* | 11/2017 | Ge | G11C 13/0007 |

(Continued)

FOREIGN PATENT DOCUMENTS

CN 111585562 A 8/2020

OTHER PUBLICATIONS

Li, X. et al., "Power-efficient neural network with artificial dendrites", Nature Nanotechnology, 2020, pp. 776-782, vol. 15.

*Primary Examiner* — Michael T Tran
(74) *Attorney, Agent, or Firm* — Scully, Scott, Murphy & Presser, P.C.

(57) ABSTRACT

A neuron simulation circuit and a neural network apparatus. The neuron simulation circuit includes an operational amplifier, a first resistive device and a second resistive device. The operational amplifier includes a first input terminal, a second input terminal, and an output terminal. The first resistive device is connected between the first input terminal or the second input terminal of the operational amplifier and the output terminal of the operational amplifier. The second resistive device is connected between the output terminal of the operational amplifier and an output terminal of the neuron simulation circuit. The second resistive device includes a threshold switching memristor, and a first terminal of the threshold switching memristor is electrically connected with the output terminal of the neuron simulation circuit. At least one of the first resistive device and the second resistive device includes a dynamic memristor.

20 Claims, 9 Drawing Sheets

(56) References Cited

U.S. PATENT DOCUMENTS

2018/0114569 A1* 4/2018 Strachan ................. G11C 11/54
2021/0150317 A1* 5/2021 Hou ..................... G11C 13/004

* cited by examiner

NEURON SIMULATION CIRCUIT AND NEURAL NETWORK APPARATUS

The present application claims priority of Chinese Patent Application No. 202011575150.7 filed on Dec. 28, 2020, the present disclosure of which is incorporated herein by reference in its entirety as part of the present disclosure.

TECHNICAL FIELD

The embodiments of the present disclosure relate to a neuron simulation circuit and a neural network apparatus.

BACKGROUND

In today's era of information explosion, the Von Neumann computing architecture in which computing units and storage units are separated needs to transfer data back and forth between the computing units and the storage units. When performing big data operations, the mismatch between the speed of data reading and computing causes the "storage wall" problem getting more and more serious. Inspired by the biological neural network, the brain-like computing, which integrates the computing units and storage units, is considered to be one of the most effective methods to solve the "storage wall" problem.

A biological neural network and a current artificial computing system differ substantially in underlying computing unit, in addition to the difference in information processing architecture. Neurons and synapses, the basic computing units of the biological neural network, include very rich ion dynamic processes. However, transistors, as the basis of the current artificial computing system, have a working mechanism that merely relies on the transportation of electrons (or holes). Introducing devices with new principles and new physical mechanisms may be able to enrich the information processing mechanism of artificial computing system, provide the artificial information processing module with richer dynamic processes, and thereby build a more efficient and intelligent artificial computing system whose capabilities are comparable to the information processing capabilities of the biological neural network.

SUMMARY

At least one embodiment of the present disclosure provides a neuron simulation circuit including an operational amplifier, a first resistive device, and a second resistive device. The operational amplifier includes a first input terminal, a second input terminal, and an output terminal. The first resistive device is connected between the first input terminal or the second input terminal of the operational amplifier and the output terminal of the operational amplifier. The second resistive device is connected between the output terminal of the operational amplifier and an output terminal of the neuron simulation circuit. The second resistive device includes a threshold switching memristor, and a first terminal of the threshold switching memristor is electrically connected with the output terminal of the neuron simulation circuit. At least one of the first resistive device and the second resistive device includes a dynamic memristor.

In some examples, the first resistive device includes the dynamic memristor. A first terminal of the dynamic memristor is electrically connected with the first input terminal or the second input terminal of the operational amplifier, and a second terminal of the dynamic memristor is electrically connected with the output terminal of the operational amplifier.

In some examples, the neuron simulation circuit further includes a first resistor. The first resistor is connected between the output terminal of the neuron simulation circuit and a first voltage terminal.

In some examples, the second resistive device includes the dynamic memristor. The dynamic memristor is in series connection or in parallel connection with the threshold switching memristor.

In some examples, in a case of the dynamic memristor in the series connection with the threshold switching memristor, the first terminal of the dynamic memristor is electrically connected with the output terminal of the operational amplifier, while the second terminal of the dynamic memristor is electrically connected with a second terminal of the threshold switching memristor.

In some examples, in a case of the dynamic memristor in the parallel connection with the threshold switching memristor, the first terminal of the dynamic memristor is electrically connected with the first terminal of the threshold switching memristor, while the second terminal of the dynamic memristor is electrically connected with the second terminal of the threshold switching memristor, as well as being electrically connected with the output terminal of the operational amplifier.

In some examples, the first resistive device includes a second resistor, one terminal of which is electrically connected with the first input terminal or the second input terminal of the operational amplifier and the other terminal is electrically connected with the output terminal of the operational amplifier.

In some examples, the first resistive device includes a first dynamic memristor. A first terminal of the first dynamic memristor is electrically connected with the first input terminal or the second input terminal of the operational amplifier, while a second terminal of the first dynamic memristor is electrically connected with the output terminal of the operational amplifier. The second resistive device includes a second dynamic memristor, which is in series connection or in parallel connection with the threshold switching memristor.

At least one embodiment of the present disclosure further provides a neural network apparatus including at least one neuron unit. The at least one neuron unit includes the neuron simulation circuit of any of the preceding embodiments.

In some examples, the neural network apparatus further includes a synapse array simulation circuit. The output signals of the synapse array simulation circuit are provided to the first input terminal or the second input terminal of the operational amplifier of the at least one neuron unit.

In some examples, the synapse array simulation circuit includes an array including a plurality of non-volatile memristors.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to mark the objectives, technical solutions and advantages of the embodiments of the present disclosure obvious, the technical solutions of the embodiments of the present disclosure are clearly and completely described below in conjunction with the accompanying drawings of the embodiments of the present disclosure. It will be obvious that the described embodiments are part of the embodiments of the present disclosure, rather than all the embodiments. Based on the described embodiments of the present disclosure, all other embodiments derived by those skilled in the art without efforts are intended to be included within the scope of the following claims.

Unless otherwise defined, the technical terms or scientific terms used in the present disclosure shall have ordinary meanings as understood by those of ordinary skills in the art to which the present disclosure belongs. Phrases such as "the first", "the second", or the like, used in the present disclosure do not indicate any order, quantity or importance, but are only used to distinguish one component from another. Phrases such as "including" or "include" or the like, mean that the element or object before that word covers the elements or objects and their equivalents listed after that word, without excluding other elements or objects. Phrases such as "connect" or "in connection with" or the like, are not limited to physical or mechanical connections, but may include electrical connections, regardless of directly or indirectly. Phrases "up", "down", "left", "right", etc., are only used to indicate the relative positional relationship. When the absolute position of the described object changes, the relative positional relationship may also change accordingly.

The human brain mainly relies on neurons and synapses for information transmission between neurons to realize information transmission and processing. Neuron is the basic unit of the brain nervous system to process information, which can be used to receive, integrate, filter, store and transmit information. Thereby, various functional activities of human can be carried out regularly, so as to adapt to the changes in internal and external environments.

Figure 1A:
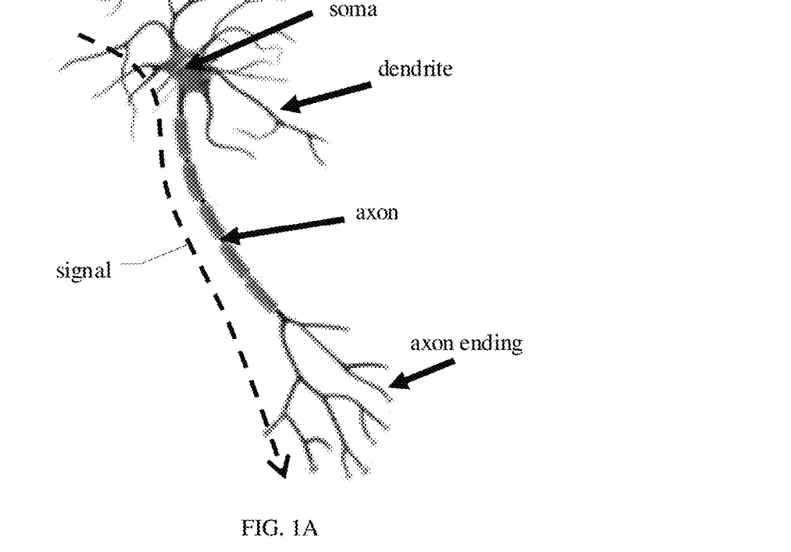
FIG. 1A is a schematic diagram of a biological neuron unit.

Neurons, the basic units of a neural network, can transmit, filter and integrate information. FIG. 1A shows one biological neuron unit. As shown in FIG. IA, a neuron includes a soma, a plurality of dendrites and an axon. The soma has the function of connecting and integrating the input information, and then transmitting the information. The function of the dendrites is to receive impulses from axons of other neurons, and then transmit these impulses to the soma. The function of the axon is to receive external stimuli, and then transmit these external stimuli from the cell body. In addition to the lateral branches, the axon forms a tree-like nerve ending at its end.

The axon ending of the neuron undergoes multiple branches, and the end of each branch expands into a cup shape or a spherical shape, which is called a synaptosome. These synaptosomes can be in contact with somata or dendrites of other neurons, which forms synapses. Such a synapse includes three parts: the presynaptic membrane, the synaptic cleft and the postsynaptic membrane.

Upon receiving a stimulus, a neuron transmits the signal to the synaptosome via the axon. The permeability of the presynaptic membrane to calcium ions increases, which causes the vesicles in the axon ending to change and thus release neurotransmitters. The neurotransmitters enter the dendrites of another neuron through the synaptic cleft. The receptors on the dendrites may be able to receive the neurotransmitters to change the ion permeability of the soma, so that the ion concentration inside and outside the cell membrane changes, which causes the changes in the internal and external potential of the soma. Thereby, information is transmitted from one neuron to another neuron. In the process of information transmission, some axons may form multiple branches at the axon endings. The potential action from the main branch of the axon may continue to be transmitted in each of the branches simultaneously, and may finally reach different target neurons. Therefore, the axon can realize the communication between multiple neurons. In another aspect, in the structure of the neural network, the branches of the axon endings of different neurons can reach the dendrites of one same neuron, forming a large number of synapses. Neurotransmitters released by the synapses from different sources may all have the effect on the change of the membrane potential of the soma of the same neuron, so that the neuron can integrate input information from different sources. In still another aspect, in the neuron, the release of neurotransmitters in the synapse and the changes in the membrane potential of the soma are continuous. When the membrane potential is higher than a certain threshold, the input information is transmitted outward by the axon. When the membrane potential is lower than the threshold, the input information cannot be transmitted outward. Thus, the neuron implements the function of information filtering.

Figure 1B:
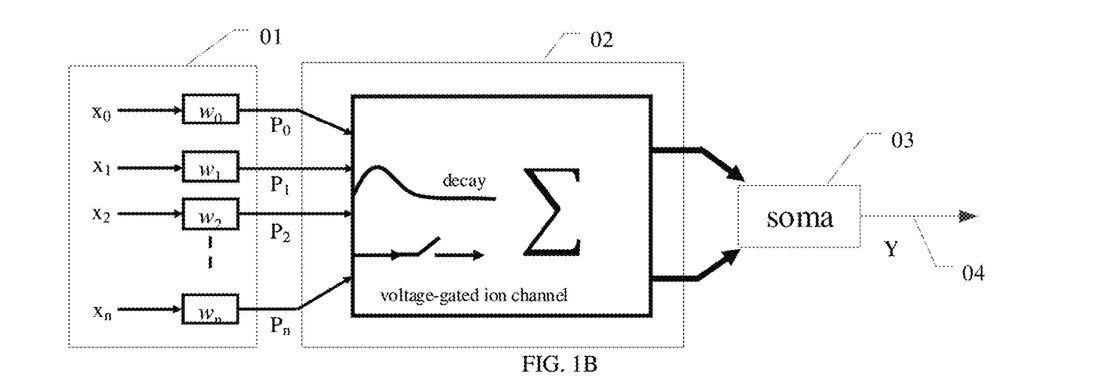
FIG. 1B is a schematic diagram of an information-processing model of a neuron.

The neuron is an information-processing unit with multiple inputs and single output, which processes the information nonlinearly. According to the functions and characteristics of the neuron, the neuron can be simplified as a simple mathematical model. FIG. 1B illustrates an information-processing model of one neuron. As shown in FIG. 1B, $x_0$, $x_1$, $x_2$, . . . $x_n$ are signals transmitted from axons of the former plurality of neurons; and $w_0$, $w_1$, $w_2$, . . . $w_n$ are the weight parameters of the synapse 01. After $x_0$, $x_1$, $x_2$, . . . $x_n$ passing through the synapse 01, input signals $P_0$, $P_1$, $P_2$, . . . $P_n$ are obtained. These input signals then enter dendrite 02, and are processed by the dendrite 02 and soma 03 to obtain output signal Y. The output signal Y is finally transmitted to axon 04, and the axon 04 can continue to transmit the output signal Y to other neurons.

When a neuron receives information from other neurons, the dendrite 02 may functions as a threshold function, which can be expressed as the following formula (1):

$$\text{channel} = \begin{cases} 0, P < \beta \\ 1, P \geq \beta \end{cases} \quad (1)$$

When the value of an output signal is larger than the threshold value β, the value of the channel is equal to 1, so that the voltage-gated ion channels in the dendrite 02 is opened and the output signal can be transmitted to the soma 03. When the value of the output signal is smaller than the threshold value β, the value of the channel is equal to 0, so that the voltage-gated ion channel in the dendrite 02 is closed; the output signal decays during the transmission in the dendrite 02, and thereby may not be transmitted to the soma 03. Upon the soma 03 receiving the output signal transmitted by the dendrite 02, the membrane potential of the soma 03 changes continuously and gradually over time. If the change of the membrane potential exceeds a certain threshold, the soma generates a sudden rising pulse signal, i.e., the output signal of the neuron. This pulse signal is then transmitted to other neurons along the axon, thus completing the information transmission between neurons.

Neurons in the biological nerve network have very rich dynamic processes and powerful spatiotemporal information-processing capabilities. Currently, neuron circuits in artificial neural networks are mainly implemented by electronic devices, such as transistors and capacitors, and such neuron circuits may only function as realizing the nonlinear activation functions in the artificial neural networks. As a result, the artificial neural network may lack the same rich ion dynamic process and strong spatiotemporal information-processing capability as biological nerve network. The current artificial neural network requires very complex network structure and consumes a large number of hardware resources when dealing with relative simple spatiotemporal tasks. To construct an artificial neural network with efficient spatiotemporal task processing capabilities is one of the main development directions in the field of brain-like computing.

At least one embodiment of the present disclosure provides a neuron simulation circuit including an operational amplifier, a first resistive device, and a second resistive device. The operational amplifier includes a first input terminal, a second input terminal, and an output terminal. The first resistive device is connected between the first input terminal or the second input terminal of the operational amplifier and the output terminal of the operational amplifier. The second resistive device is connected between the output terminal of the operational amplifier and an output terminal of the neuron simulation circuit. The second resistive device includes a threshold switching memristor, and a first terminal of the threshold switching memristor is electrically connected with the output terminal of the neuron simulation circuit. At least one of the first resistive device and the second resistive device includes a dynamic memristor.

The neuron simulation circuit provided by at least one embodiment of the present disclosure uses the dynamic memristor and the threshold switching memristor to construct the neuron simulation circuit, so that rich temporal dynamic processes may be introduced into artificial neuron modules, thereby providing key computing modules for constructing efficient artificial neural networks with spatiotemporal task-processing capabilities, as well as improving the bionic ability of the artificial neural network.

The dynamic memristor is a device that its resistance continuously decreases under the excitation of voltage or current pulse and increases (recovers) approximately exponentially over time after the excitation is removed. For example, the resistance recovery time is on the order of microseconds to milliseconds. The dynamic memristor may respond to different excitation signals (e.g., voltage signals or current signals) and thus has rich resistance behaviors. Therefore, rich temporal dynamic processes may be introduced into artificial neuron circuits.

Figure 2A:
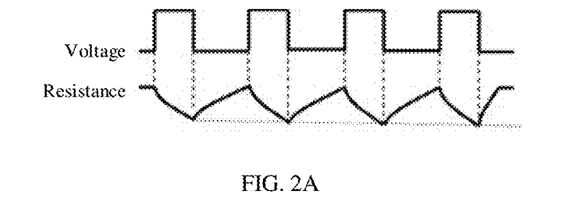
FIG. 2A-2C are the characteristic curve diagrams of a dynamic memristor.
Figure 2B:
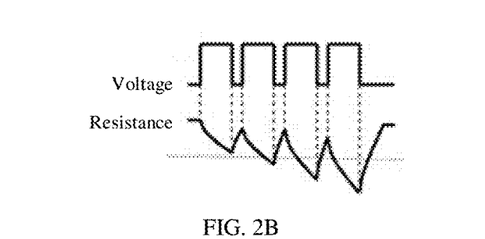
Figure 2C:
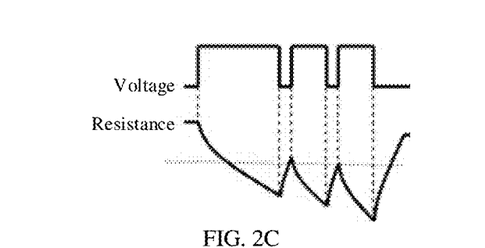

FIG. 2A-2C illustrate several characteristic curves of the dynamic memristor. These figures show the resistance change curves of the dynamic memristor in response to voltage excitation with different pulse widths and different duty ratios, respectively. As shown in FIG. 2A-2C, when the duty ratio of a voltage signal is large, which means the time width of the effective voltage within one period is large, the resistance cannot recover to the initial value within one period of the voltage signal, and thus the decay of the resistance will have an accumulative effect over the time periods. As shown in FIG. 2B, when the periods are uniform, the resistance of the dynamic memristor decreases in a step shape. For example, the resistance of the dynamic memristor has an initial value of 10M-100 G ohms, and a value of greater than 50K ohms after decay.

Figure 3:
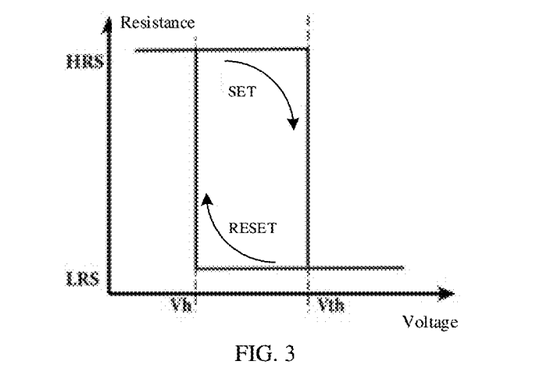
FIG. 3 is a characteristic curve diagram of a threshold switching memristor.

The threshold switching memristor is a device that can switch between a high-resistance state (HRS) and a low-resistance state (LRS) under an applied voltage. FIG. 3 illustrates the characteristic curve of the threshold switching memristor. As shown in FIG. 3, when the voltage difference applied across the threshold switching memristor is higher than its threshold voltage Vth, the device from the high-resistance state sets to the low-resistance state (SET). For a device under the low-resistance state, if the voltage across the device is lower than the hold voltage Vh, the device resets to the high-resistance state (RESET). For instance, the resistance value under the high-resistance state HRS is more than one hundred times, e.g., more than a thousand times the resistance value under the low-resistance state LRS. As an example, the high resistance value HRS is 100K-10M ohms, such as 500,000 ohms; and the low resistance value LRS is 1000-3000 ohms, such as 2000 ohms. The threshold switch memristor includes, for example, a metal atom-based conductive filament device, a Mott device, etc.

Figure 4:
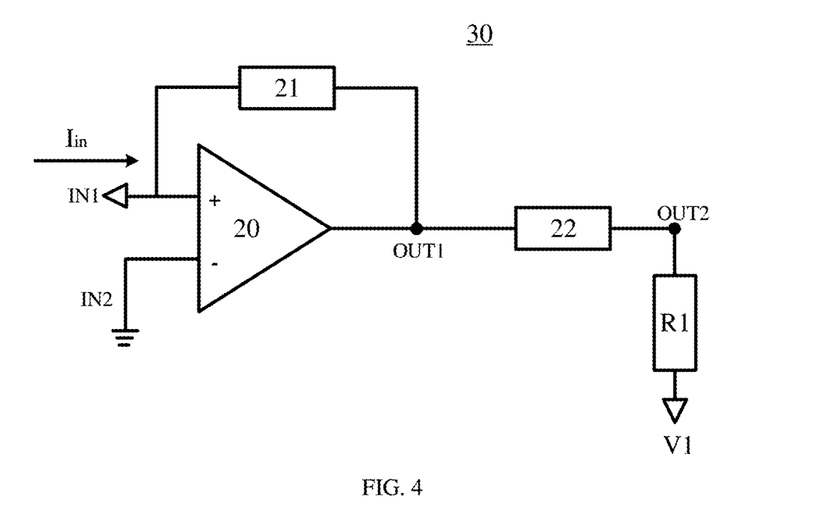
FIG. 4 is a schematic diagram of a neuron simulation circuit according to an embodiment of the present disclosure.

FIG. 4 is a schematic diagram of a neuron simulation circuit according to an embodiment of the present disclosure. As shown in FIG. 4, the neuron simulation circuit 30 includes an operational amplifier 20, a first resistive device 21, and a second resistive device 22. The operational amplifier 20 includes a first input terminal IN1, a second input terminal IN2, and an output terminal OUT1. The first resistive device 21 is connected between the first input terminal IN1 or the second input terminal IN2 of the operational amplifier and the output terminal OUT1 of the operational amplifier. For example, one of the first input terminal IN1 and the second input terminal IN2 is a non-inverting input terminal, and the other is an inverting input terminal. For example, one of the first input terminal IN1 and the second input terminal IN2 is connected with the first resistive device 21, and is configured to receive excitation signals (e.g., current signals), while the other input terminal is connected to a fixed voltage terminal, such as ground. As shown in FIG. 4, the non-inverting input terminal of the operational amplifier is electrically connected with a terminal of the first resistive device, and is configured to receive excitation signals $I_{in}$. The inverting input terminal of the operational amplifier is grounded.

For example, both the first input terminal IN1 and the second input terminal IN2 of the operational amplifier have the features of "virtual short" and "virtual disconnection". Thus, the current $I_{in}$, received at the first input terminal IN1 can be converted into a voltage signal and then output at the output terminal OUT1 through the first resistive device 21 across the first input terminal IN1 and the output terminal OUT1.

As shown in FIG. 4, the second resistive device 22 is connected between the output terminal OUT1 of the operational amplifier 21 and an output terminal OUT2 of the neuron simulation circuit. The second resistive device 22 includes a threshold switching memristor. A first terminal of the threshold switching memristor is electrically connected with the output terminal OUT2 of the neuron simulation circuit; that is, the voltage of the output terminal OUT2 is controlled by the threshold switching memristor. When the voltage difference applied across the threshold switching memristor reaches threshold voltage Vth of the threshold switching memristor, the threshold switching memristor switches from the high-resistance state to the low-resistance state, and controls the output terminal OUT2 to release pulses. As an example, such a pulse may be converted into an input excitation signal for the next layer of the neuron simulation circuit through a synaptic network, so that the neuron simulation circuit may have better bionic performance.

At least one of the first resistive device 21 and the second resistive device 22 includes a dynamic memristor. Since the dynamic memristor may have different resistance behaviors in response to excitation signals of different waveforms, introducing the dynamic memristor into the neuron simulation circuit may enable the neuron simulation circuit to deal with input signals with complex time information. Thereby, the neuron simulation circuit becomes more bionic.

The neuron simulation circuit according to the embodiments of the present disclosure will now be described below in conjunction with specific circuits, without limiting the embodiments of the present disclosure.

Figure 5A:
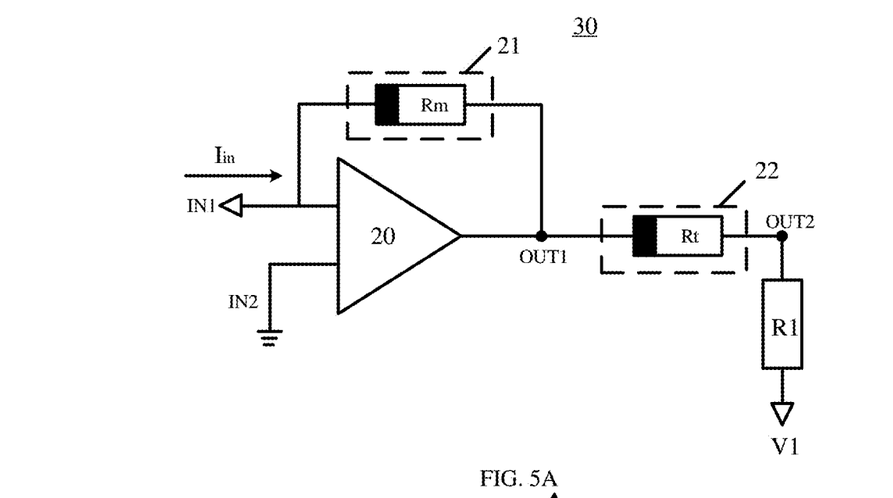
FIG. 5A is a circuit diagram of an implementation example of a neuron simulation circuit according to an embodiment of the present disclosure.

FIG. 5A illustrates a circuit diagram of an implementation example of a neuron simulation circuit according to an embodiment of the present disclosure. As shown in FIG. 5, the first resistive device 21 includes the dynamic memristor Rm. A first terminal of the dynamic memristor Rm is electrically connected with the first input terminal IN1 of the operational amplifier, and is configured to receive the input excitation signals, such as input current $I_{in}$. A second terminal of the dynamic memristor Rm is electrically connected with the output terminal OUT1 of the operational amplifier.

The second resistive device 22 includes a threshold switching memristor Rt. A terminal of the threshold switching memristor Rt is electrically connected with the output terminal OUT1 of the operational amplifier, and another terminal of the threshold switching memristor Rt is electrically connected with the output terminal OUT2 of the neuron simulation circuit.

As shown in FIG. 5A, the neuron simulation circuit 30 further includes a first resistor R1. The first resistor R1 is connected between the output terminal OUT2 of the neuron simulation circuit and a first voltage terminal V1. The first voltage terminal V1 provides a fixed low voltage. For example, the first voltage terminal V1 may be a ground terminal, which means the provided voltage is 0V. In some other examples, the voltage provided by the first voltage terminal V1 is 1V, 2V, 3V, and so on. The embodiment of the present disclosure is not limited to this. As an example, the input terminal (i.e., the second input terminal IN2 of FIG. 5A), which is not connected with the first resistive device 21, of the operational amplifier 20, may also be connected to the first voltage terminal V1.

For example, the resistance value of the first resistor R1 may be lower than 1000 ohms, such as 300-500 ohms or 500-800 ohms.

According to the characteristics of the operational amplifier, the voltage at the output terminal OUT1 of the operational amplifier and the voltage at the output terminal OUT2 of the neuron simulation circuit may be obtained, according to the following equations (2) and (3), respectively:

$$V_{OUT1} = I_{in} \times R_m \qquad (2)$$

$$V_{OUT2} = R_1 \times V_{OUT1}/(R_t + R_1) \qquad (3)$$

wherein, $R_m$, $R_t$, and $R_1$ are the resistance value of the dynamic memristor Rm, the threshold switching memristor Rt, and the first resistor R1, respectively.

Figure 5B:
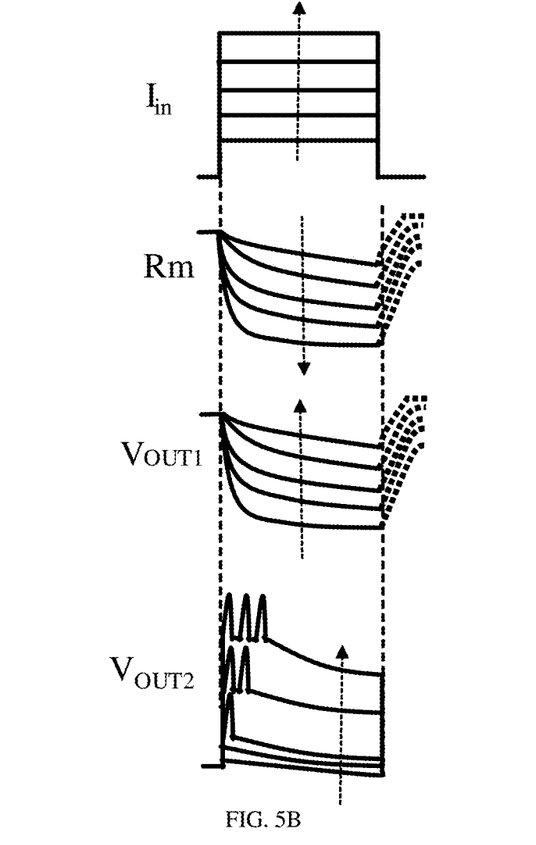
FIG. 5B-5D illustrate the characteristic curves of the neuron simulation circuit shown in FIG. 5A.
Figure 5C:
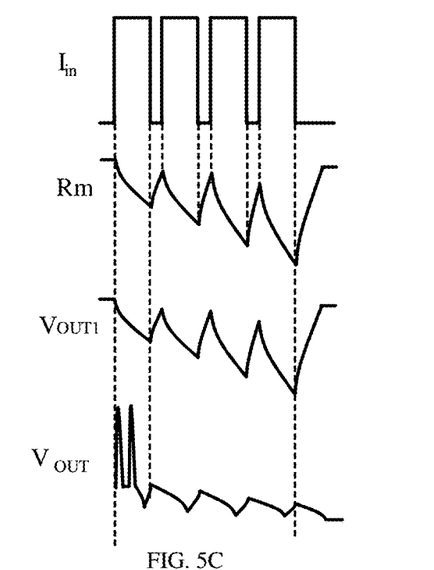
Figure 5D:
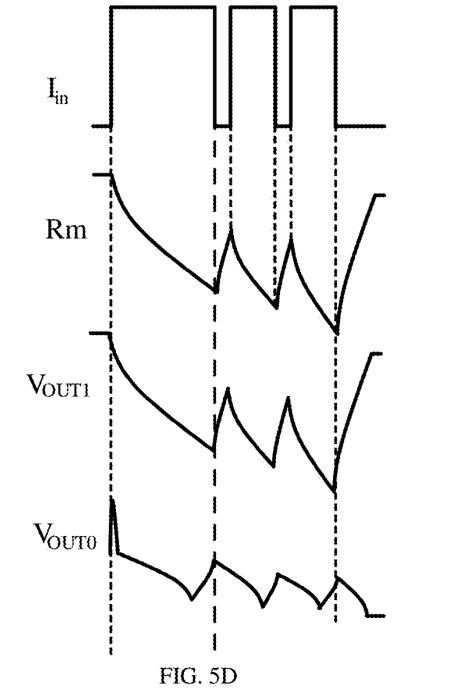

FIG. 5B-5D illustrate the curve diagrams of the change of resistance value Rm of the dynamic memristor Rm and the voltage at the output terminals OUT1, OUT2 in the neuron simulation circuit shown in FIG. 5A in response to the input current $I_{in}$, respectively. More specifically, FIG. 5B illustrates a situation where the input current $I_{in}$ gradually increases. In FIG. 5B, the direction of the change of each signal is indicated by an arrow. FIG. 5C illustrates a situation where the input current $I_{in}$ changes in uniform periodicity. FIG. 5D illustrates a situation where the periodicity of input current $I_{in}$ is non-uniform.

FIG. 5B illustrates a situation where there are five different current amplitudes within one time period, and the arrow shows the direction of the current change. As shown in FIG. 5B, when the input current $I_{in}$ flows through the dynamic memristor Rm, the resistance value Rm of the dynamic memristor Rm decreases nonlinearly. Accordingly, the voltage $V_{OUT1}$ at the output terminals OUT1 of the operational amplifier decreases nonlinearly. As the input current $I_{in}$, increases, the magnitude of the decrease of Rm increases, and the magnitude of the decrease of $Y_{OUT1}$ decreases.

At the beginning of the period, the voltage $V_{OUT1}$ at the output terminals OUT1 of the operational amplifier is large. If the voltage difference (i.e., $V_{OUT1} - V_{OUT2}$) between the two terminals of the threshold switching memristor Rt reaches the threshold voltage Vth at that time, the threshold switching memristor Rt switches from the high-resistance state to the low-resistance state. The voltage $V_{OUT2}$ at the output terminal OUT2 of the neuron simulation circuit rises rapidly and releases pulses. After that, due to the increase of the voltage $V_{OUT2}$ at the output terminal OUT2, the voltage difference between the two terminals of the threshold switching memristor Rt becomes lower than the hold voltage Vh, which causes the device to reset to the high-resistance state, such that the voltage $V_{OUT2}$ at the output terminal OUT2 drop rapidly, that is, the pulse releasing ends. In the case that the magnitude of the drop of $V_{OUT1}$ is small at the beginning, the voltage difference between the two terminals of the threshold switching memristor Rt is still higher than the hold voltage Vh when the pulse releasing ends, and the output terminal OUT2 will then continue to release pulses. Such oscillation is repeated until the voltage $V_{OUT1}$ at the output terminals OUT1 of the operational amplifier drops to the point that the threshold switching memristor Rt is not triggered to switch from the high-resistance state to the low-resistance state. The pulse releasing is over.

The neuron simulation circuit release pulses at the beginning of the period, which can be used to simulate the characteristics of the neurons that are sensitive and respond strongly to fresh stimuli, but make no response or very weak response to those familiar or old stimuli.

For example, within the same amount of time, the more pules are released (i.e., the higher the frequency of the pulse releasing), the stronger the response from the neuron simulation circuit, or it can be said that the neuron simulation circuit is more sensitive to the excitation signals. By setting different excitation conditions or device characteristics for the neuron simulation circuit, it can further control the number of pulses or the releasing frequency of the neuron simulation circuit within one or more periods, so that the neuron simulation circuit may have better bionic ability, such as simulating neurons with different sensitive characteristics.

As shown in FIG. 5C, the input current $I_{in}$ is a uniform periodic signal. In one period, in response to the valid data of the input current $I_{in}$, the resistance value Rm of the dynamic memristor Rm decreases nonlinearly. The voltage $V_{OUT1}$ at the output terminals OUT1 of the operational amplifier nonlinearly decreases accordingly. Due to the large duty ratio of the current signal, the resistance value Rm of the dynamic memristor Rm is not able to recover to the initial value within one period. With the proceeding of the time period, the decay of the resistance value Rm of the dynamic memristor Rm exhibits the accumulative effect. Accordingly, the decay of the voltage $V_{OUT1}$ is also accumulated over the time period. As shown in FIG. 5C, both the resistance value Rm of the dynamic memristor Rm and the voltage $V_{OUT1}$ at the output terminals OUT1 decrease in a step shape over the time period.

At the beginning, the voltage $V_{OUT1}$ at the output terminals OUT1 of the operational amplifier is large. At this point, the voltage difference (i.e., $V_{OUT1}-V_{OUT2}$) between the two terminals of the threshold switching memristor Rt reaches the threshold voltage Vth, causing the threshold switching memristor Rt to switch from the high-resistance state to the low-resistance state, and the voltage $V_{OUT2}$ at the output terminal OUT2 of the neuron simulation circuit rises rapidly and releases pulses. After that, due to the increase of the voltage $V_{OUT2}$ at the output terminal OUT2, the voltage difference between the two terminals of the threshold switching memristor Rt becomes lower than the hold voltage Vh, and the device resets to the high-resistance state, such that the voltage $V_{OUT2}$ at the output terminal OUT2 drop rapidly, that is, the pulse releasing ends. Such oscillation is repeated until the voltage $V_{OUT1}$ at the output terminals OUT1 of the operational amplifier drops to the point that the switch of the threshold switching memristor Rt from the high-resistance state to the low-resistance state would not be triggered, and the pulse releasing is over. When the first period finishes, since the resistance value Rm of the dynamic memristor Rm cannot recover to the initial value, the switch of the threshold switching memristor Rt from the high-resistance state to the low-resistance state is not triggered, and the pulse releasing ends. Here the case of multiple pulses releasing is simulated.

As shown in FIG. 5D, the input current $I_{in}$ is a non-uniform periodic signal. The duration and the duty ratio of the first period are larger than the subsequent periods. In each period, in response to the valid data of the input current $I_{in}$, the resistance value Rm of the dynamic memristor Rm decreases nonlinearly. The voltage $V_{OUT1}$ at the output terminals OUT1 of the operational amplifier nonlinearly decreases accordingly. Due to the large duty ratio of the current signal, the resistance value Rm of the dynamic memristor Rm is not able to recover to the initial value within one period. With the proceeding of the time period, the decay of the resistance value Rm of the dynamic memristor Rm exhibits the accumulative effect. Accordingly, the decay of the voltage $Y_{OUT1}$ is accumulated over the time period. As shown in FIG. 5D, both the resistance value Rm of the dynamic memristor Rm and the voltage $V_{OUT1}$ at the output terminals OUT1 decrease in a step shape over the time period.

At the beginning, the voltage $V_{OUT1}$ at the output terminals OUT1 of the operational amplifier is large. At this point, the voltage difference (i.e., $V_{OUT1}-V_{OUT2}$) between the two terminals of the threshold switching memristor Rt reaches the threshold voltage Vth, causing the threshold switching memristor Rt to switch from the high-resistance state to the low-resistance state, and the voltage $V_{OUT2}$ at the output terminal OUT2 of the neuron simulation circuit rises rapidly and releases pulses. After that, due to the increase of the voltage $V_{OUT2}$ at the output terminal OUT2, the voltage difference between the two terminals of the threshold switching memristor Rt becomes lower than the hold voltage Vh of the threshold switching memristor Rt, and the device resets to the high-resistance state, such that the voltage $V_{OUT2}$ at the output terminal OUT2 drop rapidly, that is, the pulse releasing ends. Since the pulse width of the input current $I_{in}$ of the first period is wide, the resistance value Rm of the dynamic memristor Rm monotonically decreases in response to this pulse. Compared with the embodiment shown in FIG. 5C, given the same time duration, the effect of a wide current pulse on the dynamic memristor Rm is stronger than the combined effect of two narrow current pulses. Therefore, after first pulse is released, the resistance value Rm of the dynamic memristor Rm may decay too low to once again trigger the threshold switching memristor Rt to switch from the high-resistance state to the low-resistance state. The pulse releasing is over. Here the case of a single pulse releasing is simulated.

In some other examples, the second resistive device 22 may include a dynamic memristor Rm. The dynamic memristor Rm may be in series connection or in parallel connection with the threshold switching memristor Rt.

Figure 6A:
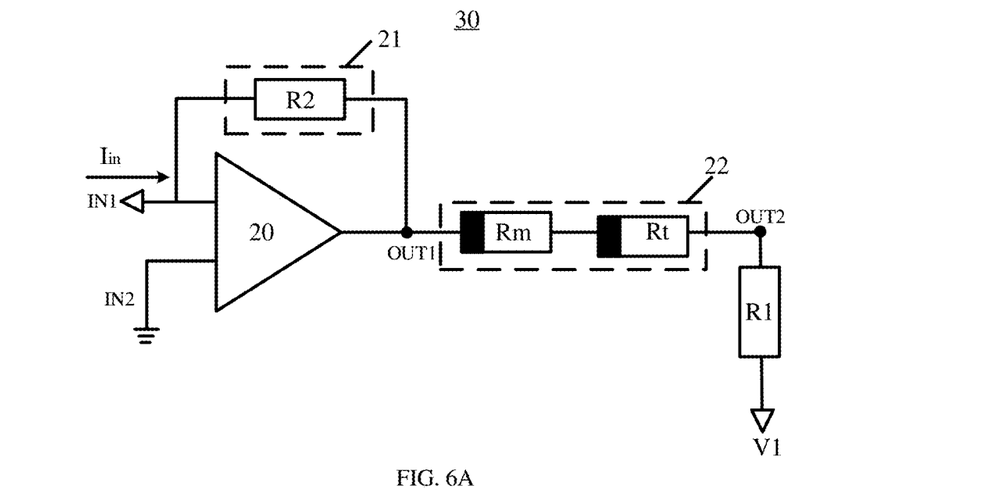
FIG. 6A is a circuit diagram of an implementation example of a neuron simulation circuit according to another embodiment of the present disclosure.

FIG. 6A illustrates a circuit diagram of an implementation example of a neuron simulation circuit according to another embodiment of the present disclosure. As shown in FIG. 6A, the second resistive device 22 includes a dynamic memristor Rm. The first terminal of the dynamic memristor Rm is electrically connected with the output terminal OUT1 of the operational amplifier. The two terminals of the threshold switching memristor Rt are electrically connected with second terminal of the dynamic memristor Rm and the output terminal OUT2, respectively. That is, the dynamic memristor Rm is in series connection with the threshold switching memristor Rt.

As shown in FIG. 6A, the first resistive device 21 includes a second resistor R2. One terminal of the second resistor R2 is electrically connected with the first input terminal N1 of the operational amplifier, and is configured to receive the input current $I_{in}$. The other terminal of the second resistor R2 is electrically connected with the output terminal OUT1 of the operational amplifier. For example, the resistance value of the second resistor R2 is 100K-10M ohms.

According to the characteristics of the operational amplifier, the voltage at the output terminal OUT1 of the operational amplifier and the voltage at the output terminal OUT2 of the neuron simulation circuit may be obtained, according to the following equations (4) and (5), respectively:

$$V_{OUT1} = I_{in} \times R_2 \quad (4)$$

$$V_{OUT2} = R_1 \times V_{OUT1}/R_t + R_1) \quad (5)$$

wherein, $R_m$, $R_t$, $R_1$, and $R_2$ are the resistance value of the dynamic memristor Rm, the threshold switching memristor Rt, the first resistor R1, and the second resistor R2, respectively.

Figure 6B:
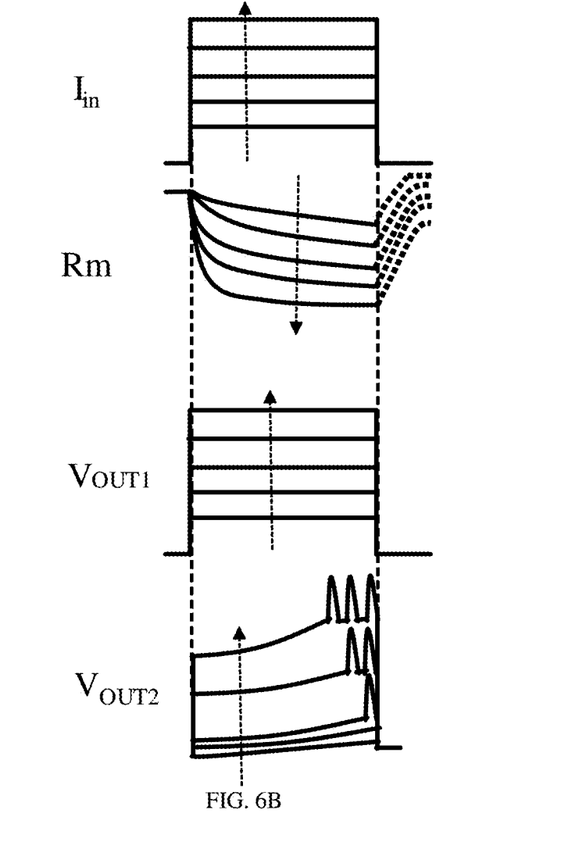
FIG. 6B-6D illustrate the characteristic curves of the neuron simulation circuit shown in FIG. 6A.
Figure 6C:
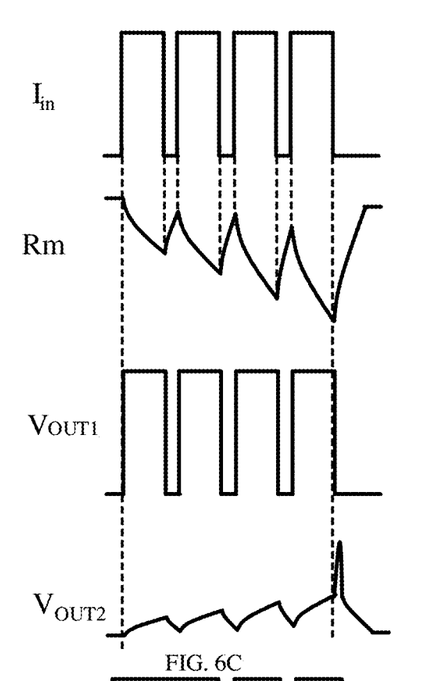
Figure 6D:
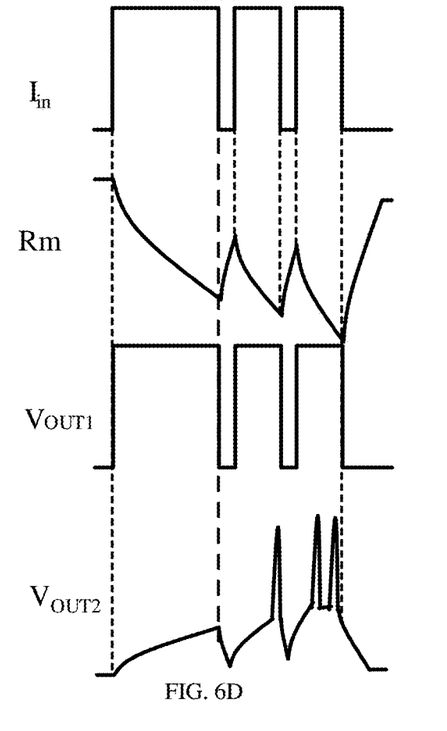

FIG. 6B-6D illustrate the curve diagrams of the change of resistance value Rm of the dynamic memristor Rm and the voltage at the output terminals OUT1, OUT2 in the neuron simulation circuit shown in FIG. 6A in response to the input current $I_{in}$, respectively. More specifically, FIG. 6B illustrates a situation where the input current $I_{in}$ gradually increases. In FIG. 6B, the direction of the change of each signal is indicated by an arrow. FIG. 6C illustrates a situation where the input current $I_{in}$ changes in uniform periodicity. FIG. 6D illustrates a situation where the periodicity of input current $I_{in}$ is non-uniform.

FIG. 6B illustrates a situation where there are five different current amplitudes within one time period, and the arrow shows the direction of the current change. As shown in FIG. 6B, since the second resistor R2 is a constant resistance, the voltage $V_{OUT1}$ at the output terminals OUT1 of the operational amplifier maintains constant as the input current $I_{in}$ does not change. The resistance value Rm of the dynamic memristor Rm decreases nonlinearly in response to the input current, while the voltage $V_{OUT2}$ at the output terminal OUT2 of the neuron simulation circuit nonlinear rises accordingly. As the input current $I_{in}$, increases, the magnitude of the decrease of Rm increases, and $Y_{OUT1}$ increases linearly. Thereby, the number of pulses that may be allowed to be released within one period increases.

When the resistance value Rm of the dynamic memristor Rm lowers to a certain degree, the voltage difference between the two terminals of the threshold switching memristor Rt reaches the threshold voltage Vth, the threshold switching memristor Rt will switch from the high-resistance state to the low-resistance state. The voltage $V_{OUT2}$ at the output terminal OUT2 of the neuron simulation circuit rises rapidly and releases pulses. After that, due to the increase of the voltage $V_{OUT2}$ at the output terminal OUT2, the voltage difference between the two terminals of the threshold switching memristor Rt becomes lower than the hold voltage Vh of the threshold switching memristor Rt, and the device resets to the high-resistance state, such that the voltage $V_{OUT2}$ at the output terminal OUT2 drop rapidly, that is, the pulse releasing ends. In the case that the magnitude of the drop of resistance value Rm of the dynamic memristor Rm is large, the voltage difference between the two terminals of the threshold switching memristor Rt is still higher than the hold voltage Vh when the pulse releasing ends, and the output terminal OUT2 will then continue to release pulses. Such oscillation is repeated until the current period ends. The pulse releasing is over.

The neuron simulation circuit may be used to simulate the acquiring of the learning ability of neurons. When continuously applied with the same signal, the neuron simulation circuit will integrate in response to that signal. Once the integral reaches the threshold, the pulse is released.

For example, within the same amount of time, the more pulses are released (i.e., the higher the frequency of the pulse releasing), the stronger the response from the neuron simulation circuit, or it can be said that the neuron simulation circuit is more sensitive to the excitation signals. By setting different excitation conditions or device characteristics for the neuron simulation circuit, it can further control the number of pulses or the pulse releasing frequency of the neuron simulation circuit within one or more periods. So that the neuron simulation circuit may have better bionic ability, such as simulating neurons with different sensitive characteristics.

As shown in FIG. 6C, the input current $I_{in}$ is a uniform periodic signal. In one period, in response to the valid data of the input current $I_{in}$, the resistance value Rm of the dynamic memristor Rm decreases nonlinearly. The voltage $V_{OUT2}$ at the output terminal OUT2 of the neuron simulation circuit nonlinear increases accordingly. Due to the large duty ratio of the current signal, the resistance value Rm of the dynamic memristor Rm is not able to recover to the initial value within one period. With the proceeding of the time period, the decay of the resistance value Rm of the dynamic memristor Rm exhibits the accumulative effect. The increase of the voltage $V_{OUT2}$ is also accumulated over the time period. As shown in FIG. 6C, the resistance value Rm of the dynamic memristor Rm decreases in a step shape over the time period, and the voltage $V_{OUT2}$ at the output terminals OUT2 of the neuron simulation circuit increases in a step shape over the time period.

After the accumulation of several time periods, the resistance value Rm of the dynamic memristor Rm lowers to a certain degree, such that the voltage difference between the two terminals of the threshold switching memristor Rt reaches the threshold voltage Vth of the threshold switching memristor Rt, and the threshold switching memristor Rt switches from the high-resistance state to the low-resistance state. The voltage $V_{OUT2}$ at the output terminal OUT2 of the neuron simulation circuit rises rapidly and releases pulses. After that, due to the increase of the voltage $V_{OUT2}$ at the output terminal OUT2, the voltage difference between the two terminals of the threshold switching memristor Rt becomes lower than the hold voltage Vh, and the device resets to the high-resistance state, such that the voltage $V_{OUT2}$ at the output terminal OUT2 drop rapidly, that is, the pulse releasing ends. Here the case of a single pulse releasing is simulated.

As shown in FIG. 6D, the input current $I_{in}$ is a non-uniform periodic signal. The duration and the duty ratio of the first period are larger than the subsequent periods. In one period, in response to the valid data of the input current $I_{in}$, the resistance value Rm of the dynamic memristor Rm decreases nonlinearly. Due to the large duty ratio of the current signal, the resistance value Rm of the dynamic memristor Rm is not able to recover to the initial value within one period. With the proceeding of the time period, the decay of the resistance value Rm of the dynamic memristor Rm exhibits the accumulative effect. The increase of the voltage $V_{OUT2}$ is also accumulated over the time period. As shown in FIG. 6D, the resistance value Rm of the dynamic memristor Rm decreases in a step shape over the time period, and the voltage $V_{OUT2}$ at the output terminal OUT2 of the neuron simulation circuit increases in a step shape over the time period.

After the accumulation of several time periods, the resistance value Rm of the dynamic memristor Rm lowers to a certain degree, such that the voltage difference between the two terminals of the threshold switching memristor Rt reaches the threshold voltage Vth of the threshold switching memristor Rt, and the threshold switching memristor Rt switches from the high-resistance state to the low-resistance state. The voltage $V_{OUT2}$ at the output terminal OUT2 of the neuron simulation circuit rises rapidly and release pulses. After that, due to the increase of the voltage $V_{OUT2}$ at the output terminal OUT2, the voltage difference between the two terminals of the threshold switching memristor Rt becomes lower than the hold voltage Vh, and the device resets to the high-resistance state, such that the voltage $V_{OUT2}$ at the output terminal OUT2 drop rapidly, that is, the pulse releasing ends. Since the pulse width of the input current $I_{in}$ of the first period is wide, the resistance value Rm of the dynamic memristor Rm monotonically decreases in response to this pulse. Compared with the embodiment shown in FIG. 6C, given the same time duration, the effect of a wide current pulse on the dynamic memristor Rm is stronger than the combined effect of two narrow current pulses. Therefore, after the first pulse is released, the resistance value Rm of the dynamic memristor Rm may be of a low value, and the voltage $V_{OUT2}$ at the output terminal OUT2 of the neuron simulation circuit can oscillate repeatedly and release multiple pulses. Here the case of multiple pulses releasing is simulated.

Figure 7A:
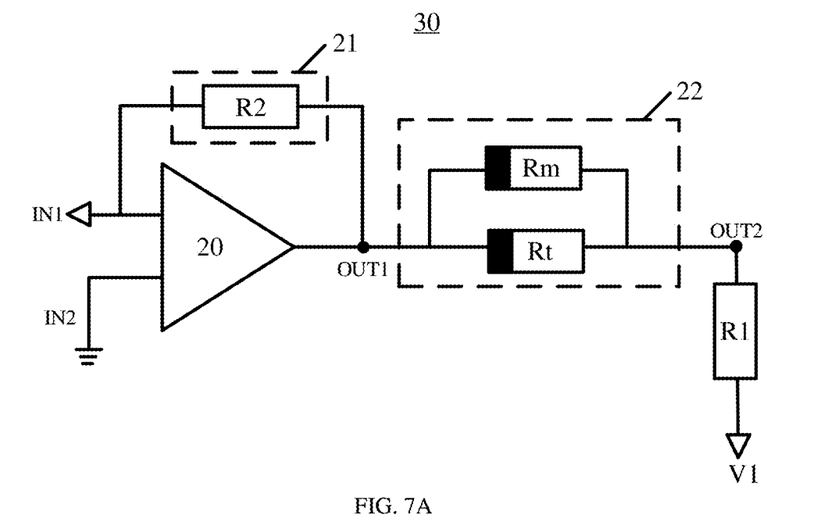
FIG. 7A-7B are circuit diagrams of neuron simulation circuits according to still some other embodiments of the present disclosure.
Figure 7B:
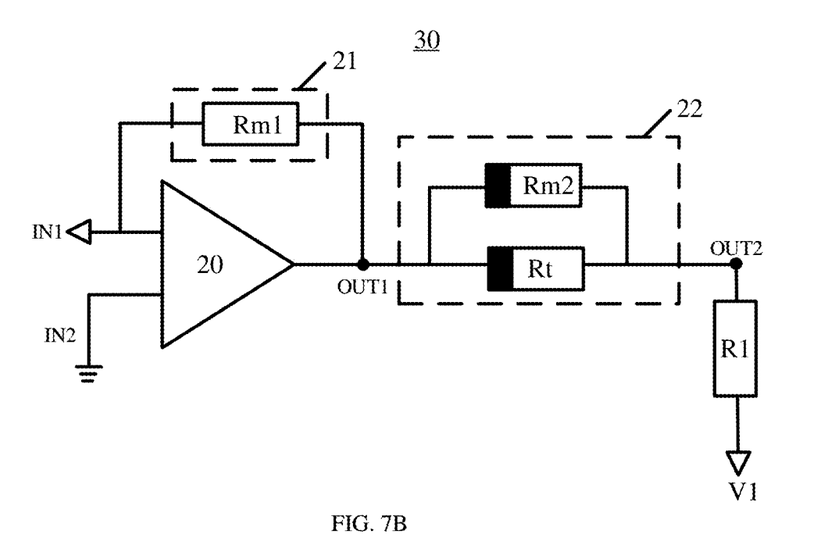

FIG. 7A and FIG. 7B respectively illustrate circuit diagrams of neuron simulation circuits according to still some other embodiments of the present disclosure.

The difference between the embodiment shown in FIG. 7A and the embodiment shown in FIG. 6A is that, in the second resistive device 22, the dynamic memristor Rm is in parallel connection with the threshold switching memristor Rt. The two terminals of the dynamic memristor Rm are electrically connected with the two terminals of the threshold switching memristor Rt, respectively.

The difference between the embodiment shown in FIG. 7B and the embodiment shown in FIG. 5A is that, other than the first resistor R1 including a first dynamic memristor Rm1, the second resistor R2 further includes a second dynamic memristor Rm2 The second dynamic memristor Rm2 may be in series connection or in parallel connection with the threshold switching memristor Rt. FIG. 7B illustrates the situation where the two of them are directly connected in parallel.

For example, according to the needs of the circuit, a plurality of dynamic memristors may be introduced into the neuron simulation circuit to simulate a much richer dynamic temporal process, thereby improving the bionic ability of the artificial neural network.

At least one embodiment of the present disclosure further provides a neural network apparatus. The neural network apparatus includes at least one neuron unit. The neuron unit includes the neuron simulation circuit 30 of any of the preceding embodiments.

Figure 8:
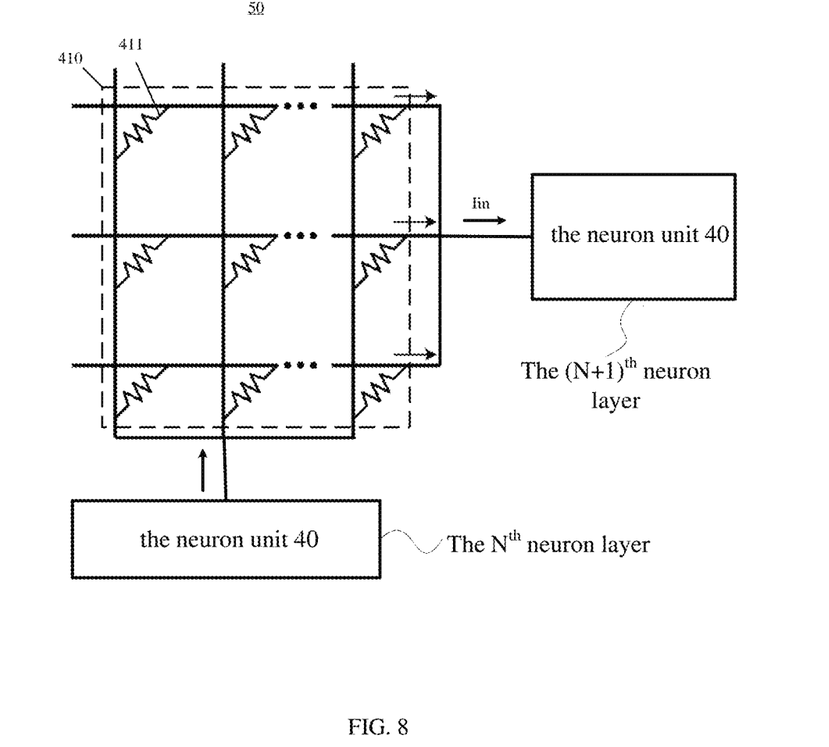
FIG. 8 is a schematic diagram of a neural network apparatus according to an embodiment of the present disclosure.

FIG. 8 illustrates a neural network apparatus 50 according to an embodiment of the present disclosure. As shown in FIG. 8, the neural network apparatus 50 includes multiple neuron layers which are connected layer-by-layer. FIG. 8 illustrates the Nth neuron layer and its adjacent (N+1)th neuron layer, with the arrows indicating the direction of signal transmission. Each of the neuron layers includes a plurality of neuron units 40. Each neuron unit includes the neuron simulation circuit 30 of any of the preceding embodiments.

As shown in FIG. 8, the neural network apparatus 50 further includes a synapse array simulation circuit 410. The Nth neuron layer and the (N+1)th neuron layer are connected via the synapse array simulation circuit 410. The output signals of the synapse array simulation circuit 410 are provided to the first input terminal or the second input terminal of the operational amplifier of the neuron simulation circuit 30 in the next layer as excitation signals. When the upper neuron layer outputs pulse-driving signals in response to the excitation signals, the pulse-driving signals form weighted current $I_{in}$ through the synapse array simulation circuit. The weighted current $I_{in}$ is then input to a next neuron layer as the excitation signals of the next neuron layer, and thus the information transmission between neurons is completed.

As shown in FIG. 8, the synapse array simulation circuit 410 includes an array including a plurality of resistive devices 411. These resistive devices 411 are used for simulating synapses. For example, weight parameters of the synapses may be adjusted by adjusting the resistance value of each of the resistive devices 411.

For example, the resistive devices 411 may be constant resistance or memristors. In an example, the resistive devices 411 are non-volatile memristors.

Figure 9:
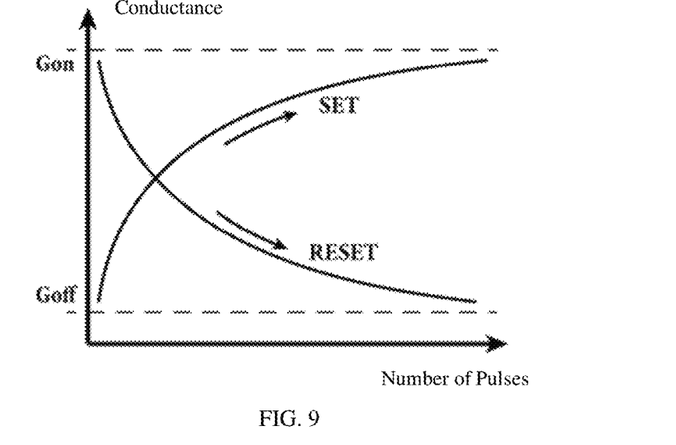
FIG. 9 is a characteristic curve diagram of a non-volatile memristor.

Non-volatile memristor is a resistive device that its conductance state may continuously change between an on-state conductance Gon and an off-state conductance Goff with the applied excitation signals. FIG. 9 illustrates the characteristic curve of the non-volatile memristor. As shown in FIG. 9A, the non-volatile memristor has good data retention capabilities, and can change the conductance state approximately continuously when external voltage excitation signals are applied, while maintaining the conductance state if no electric signal excitation is applied. For example, the non-volatile memristor includes conductive filament device and interface state device.

An artificial neural network which is constructed based on using the synapse array simulation circuit 410 formed by non-volatile memristors to simulate the connection strength between neurons in a biological neural network, compared with the traditional transistor-based neural network hardware systems, has obvious advantages in power consumption and speed.

The above mentioned are only the specific embodiments of the present disclosure, but the scope of protection of the present disclosure is not limited thereto. The scope of protection of the present disclosure shall be subject to the scope of the appended claims.

What is claimed is:

1. A neuron simulation circuit, comprising: an operational amplifier, a first resistive device, and a second resistive device,
    wherein the operational amplifier comprises a first input terminal, a second input terminal, and an output terminal, and the first resistive device is connected between the first input terminal or the second input terminal of the operational amplifier and the output terminal of the operational amplifier;
    the second resistive device is connected between the output terminal of the operational amplifier and an output terminal of the neuron simulation circuit;
    the second resistive device comprises a threshold switching memristor, and a first terminal of the threshold switching memristor is electrically connected with the output terminal of the neuron simulation circuit; and
    at least one selected from the group consisting of the first resistive device and the second resistive device comprises a dynamic memristor.

2. The neuron simulation circuit of claim 1, wherein the first resistive device comprises the dynamic memristor,
    a first terminal of the dynamic memristor is electrically connected with the first input terminal or the second input terminal of the operational amplifier, and a second terminal of the dynamic memristor is electrically connected with the output terminal of the operational amplifier.

3. The neuron simulation circuit of claim 2, further comprising a resistor,
  wherein a first terminal of the resistor is electrically connected with the output terminal of the neuron simulation circuit and a second terminal of the resistor is electrically connected with a first voltage terminal.

4. The neuron simulation circuit of claim 1, further comprising a resistor,
  wherein a first terminal of the resistor is electrically connected with the output terminal of the neuron simulation circuit and a second terminal of the resistor is electrically connected with a first voltage terminal.

5. The neuron simulation circuit of claim 1, wherein the second resistive device comprises the dynamic memristor, and
  the dynamic memristor is in series connection or in parallel connection with the threshold switching memristor.

6. The neuron simulation circuit of claim 5, wherein the dynamic memristor is in series connection with the threshold switching memristor;
  a first terminal of the dynamic memristor is electrically connected with the output terminal of the operational amplifier, and a second terminal of the dynamic memristor is electrically connected with a second terminal of the threshold switching memristor.

7. The neuron simulation circuit of claim 6, wherein the first resistive device comprises a first resistor;
  a first terminal of the first resistor is electrically connected with the first input terminal or the second input terminal of the operational amplifier, and a second terminal of the first resistor is electrically connected with the output terminal of the operational amplifier and the first terminal of the dynamic memristor.

8. The neuron simulation circuit of claim 7, further comprising a second resistor,
  wherein a first terminal of the second resistor is electrically connected with the output terminal of the neuron simulation circuit, and a second terminal of the second resistor is electrically connected with a first voltage terminal.

9. The neuron simulation circuit of claim 8, wherein the first terminal of the first resistor is electrically connected with the first input terminal of the operational amplifier, and the second input terminal of the operational amplifier and the first voltage terminal are both grounded.

10. The neuron simulation circuit of claim 9, wherein the first input terminal of the operational amplifier is a non-inverting input terminal.

11. The neuron simulation circuit of claim 5, wherein the dynamic memristor is in parallel connection with the threshold switching memristor, and a first terminal of the dynamic memristor is electrically connected with the first terminal of the threshold switching memristor; and
  a second terminal of the dynamic memristor is electrically connected with a second terminal of the threshold switching memristor, and is electrically connected with the output terminal of the operational amplifier.

12. The neuron simulation circuit of claim 11, wherein the first resistive device comprises a first resistor;
  a first terminal of the first resistor is electrically connected with the first input terminal or the second input terminal of the operational amplifier, and a second terminal of the first resistor is electrically connected with the output terminal of the operational amplifier, the first terminal of the dynamic memristor and the first terminal of the threshold switching memristor.

13. The neuron simulation circuit of claim 12, further comprising a second resistor,
  a first terminal of the second resistor is electrically connected with the output terminal of the neuron simulation circuit, and a second terminal of the second resistor is electrically connected with a first voltage terminal.

14. The neuron simulation circuit of claim 13, wherein the first terminal of the first resistor is electrically connected with the first input terminal of the operational amplifier, and the second input terminal of the operational amplifier and the first voltage terminal are both grounded.

15. The neuron simulation circuit of claim 14, wherein the first input terminal of the operational amplifier is a non-inverting input terminal.

16. The neuron simulation circuit of claim 1, wherein the first resistive device comprises a first dynamic memristor,
  a first terminal of the first dynamic memristor is electrically connected with the first input terminal or the second input terminal of the operational amplifier, and a second terminal of the first dynamic memristor is electrically connected with the output terminal of the operational amplifier; and
  the second resistive device comprises a second dynamic memristor in series connection or in parallel connection with the threshold switching memristor.

17. The neuron simulation circuit of claim 16, further comprising a resistor,
  a first terminal of the resistor is electrically connected with the output terminal of the neuron simulation circuit, and a second terminal of the resistor is electrically connected with a first voltage terminal.

18. The neuron simulation circuit of claim 17, wherein the first terminal of the first dynamic memristor is electrically connected with the first input terminal of the operational amplifier, and the second input terminal of the operational amplifier and the first voltage terminal are both grounded.

19. A neural network apparatus, comprising at least one neuron unit,
  wherein the at least one neuron unit comprises the neuron simulation circuit of claim 1.

20. The neural network apparatus of claim 19, further comprising a synapse array simulation circuit,
  wherein an output signal of the synapse array simulation circuit is provided to the first input terminal or the second input terminal, which is connected with the first resistive device, of the operational amplifier of the at least one neuron unit; and
  the synapse array simulation circuit comprises a plurality of non-volatile memristors arranged in an array.

* * * * *